United States Patent
Elliott et al.

[11] Patent Number: 5,905,001
[45] Date of Patent: May 18, 1999

[54] ELECTRODE EDGE DESIGN

[75] Inventors: William B. Elliott, Alden; William B. Paulot, Lancaster; Sally Ann Smesko, North Tonawanda, all of N.Y.

[73] Assignee: Wilson Greatbatch Ltd., Clarence, N.Y.

[21] Appl. No.: 08/910,166

[22] Filed: Aug. 13, 1997

[51] Int. Cl.⁶ .................................................. H01M 4/02
[52] U.S. Cl. ........................... 429/169; 429/174; 429/211
[58] Field of Search .................................. 429/163, 164, 429/174, 231.7, 165, 166, 168, 211

[56] References Cited

U.S. PATENT DOCUMENTS

| | | |
|---|---|---|
| 1,587,326 | 6/1926 | Johnson et al. |
| 2,649,492 | 8/1953 | Linton et al. ............................ 136/111 |
| 4,020,242 | 4/1977 | Okazaki et al. .......................... 429/66 |
| 4,401,736 | 8/1983 | Zayatz ..................................... 429/211 |
| 4,429,026 | 1/1984 | Bruder .................................... 429/152 |
| 4,601,962 | 7/1986 | Zayatz ..................................... 429/211 |
| 5,209,994 | 5/1993 | Blattenberger et al. ................ 429/213 |
| 5,234,778 | 8/1993 | Wright .................................... 429/103 |
| 5,250,373 | 10/1993 | Muffoletto et al. .................... 429/161 |
| 5,384,217 | 1/1995 | Binder et al. ........................... 429/225 |
| 5,716,728 | 2/1998 | Smesko et al. .......................... 429/60 |
| 5,750,286 | 5/1998 | Paulot et al. ............................ 429/211 |

*Primary Examiner*—Maria Nuzzolillo
*Assistant Examiner*—Angela J. Martin
*Attorney, Agent, or Firm*—Hodgson, Russ, Andrews, Woods & Goodyear LLP

[57] ABSTRACT

The present invention is directed to a novel electrode edge having a full radius shape used in combination with a novel terminal lead/current collector connection to increase both the gravimetric and volumetric energy densities of the cell by occupying previously unused space within the casing.

35 Claims, 3 Drawing Sheets

ELECTRODE EDGE DESIGN

BACKGROUND OF THE INVENTION

1. Field of the Invention

The present invention relates to the art of electrochemical cells, and more particularly, to a novel electrode construction that improves the efficiency of a prismatic electrochemical cell by use of a full radius edge structure. This electrode shape is used in combination with a novel terminal lead/current collector connection to increase both the gravimetric and volumetric energy densities of the cell by occupying previously unused space within the casing.

2. Prior Art

The recent rapid development in small-sized electronic devices having various shape and size requirements necessitates comparably small-sized electrochemical cells of different designs that can be easily manufactured to power such electronic devices. These size and power considerations mean that the cell must have a high energy density, and one commonly used cell configuration for this purpose is a prismatic cell design.

A perspective view of the present state-of-the-art construction for a prismatic electrochemical cell 10 design is shown in FIGS. 1 to 3 and described in U.S. Pat. No. 5,250,373 to Muffoletto et al., which is assigned to the assignee of the present invention and incorporated herein by reference. Such a cell includes a casing 12 having spaced-apart generally planar front and back side walls 14 and 16 joined by curved end walls 18 and 20 which curve into a bottom wall 22 that curves up to meet the side walls 14, 16. The open top of casing 12 is closed by a lid 24. The casing 12 houses a cathode electrode, generally designated 26 (FIG. 3), in electrical association with an anode electrode, generally designated 34. Cathode electrode 26 comprises plates 28, 30 contacting a cathode current collector 32 to provide the cathode having a peripheral edge 35 normal to the plane of the opposed major surfaces thereof.

The anode electrode 34 for the prismatic cell 10 is comprised of anode plates 36 and 38 contacting corresponding wing sections 40 and 42, respectively, joined by the intermediate web section 44 of an anode current collector. A separator 46 is provided between the cathode electrode 26 and the anode electrode 34 to prevent direct physical contact between them. Shielding and insulating sheets, generally referred to as numeral 48, are also provided between the web section 44 of the anode current collector and the cathode electrode 26. The casing 12 and lid 24 are in electrical contact with the anode electrode 34 and serve as the anode terminal for the case-negative electrochemical cell 10. The cathode terminal is provided by a lead 50 which is electrically insulated from lid 24 and casing 12 by a glass-to-metal seal 52. The distal end of a tab 54 extending outwardly from the cathode current collector 32 provides a coupling element 56 comprising a tube which receives the inner end of the cathode terminal lead 50 therein.

To construct an anode-cathode subassembly according to the prior art, the cathode plates 28, 30 are pressed together and bonded against the current collector 32. Separately, the anode plates 36, 38 are pressure bonded to the corresponding anode wing sections 40, 42 and the web section 44 of the anode current collector is welded to the lid 24, which together with the cell casing provides the negative terminal for the cell. The shielding and insulating sheets 48 are then disposed between the web section 44 and the cathode electrode 26 heat sealed into the separator 46. The cathode terminal lead 50, electrically insulated from the lid 24 by the glass-to-metal seal 52, is then spot welded to the tube 56 to provide the positive cell terminal. This construction only provides a single spot weld at the open end thereof for connection to lead 50. It is desirable to provide a more robust construction for the positive lead connected to the cathode current collector.

The prior art prismatic cell 10 is completed by folding the anode wing sections 40, 42 with the associated anode lithium elements 36, 38 relative to the web section 44 and toward each other to position the anode elements 36, 38 in operative contact with the oppositely directed surfaces of the cathode electrode 26 having the separator 46 disposed between the anode and cathode electrodes. The cell is then activated by filling the casing 12 with an electrolyte 58 through an opening 60 provided in lid 24 after the cell components have been assembled therein and lid 24 has been welded to casing 12. In its fully assembled condition shown in FIG. 1, a closure means 62 is hermetically sealed in opening 60 to close the cell. The closure 62 is insulated from the interior of the cell by an insulator structure 64 (FIG. 2).

SUMMARY OF THE INVENTION

An improved, more robust construction for the connection of the cathode terminal lead to the cathode current collector is described in detail in U.S. Pat. No. 5,750,286 to Paulot et al entitled "Dual Terminal Configured Current Collector", which is assigned to the assignee of the present invention and incorporated herein by reference. However, in order to facilitate space for the improved cathode terminal lead/current collector construction, a portion 66 (shown in dashed lines in FIG. 2) of the cathode active material immediately adjacent thereto was removed. To compensate for the reduced quantity of cathode active material proximate the cathode terminal lead/current collector, the cathode electrode according to the present invention is constructed to take advantage of space that was previously unused in the construction of the prior art prismatic cell 10.

As previously described, the cathode plates 28, 30 pressed to the current collector of the prior art cathode electrode 26 provide the peripheral edge 35 normal to the major surfaces thereof. In other words, the cathode has the flat edge 35 (FIG. 3) adjacent to the curved end walls 18, 20 and the bottom wall 22 of the casing 12. This construction detracts from cell gravimetric and volumetric energy densities as there is internal casing volume which is not utilized through discharge reactions.

In contrast, the casing for the prismatic cell of the present invention has a semicircular shape with a curved radial edge meeting spaced apart planar side walls. The internal volume inside such a casing is more efficiently utilized by providing the cathode electrode having a matching semicircular shape with a curved radial edge approximating that of the casing. In conjunction with the previously described cathode terminal lead connected to the cathode current collector, the prismatic cell of the present invention provides a more robust cell construction without detracting from the cell's overall gravimetric and volumetric energy densities.

The foregoing and additional advantages and characterizing features of the present invention will become clearly apparent upon a reading of the following detailed description together with the included drawings.

BRIEF DESCRIPTION OF THE DRAWING FIGURES

Figure 5:
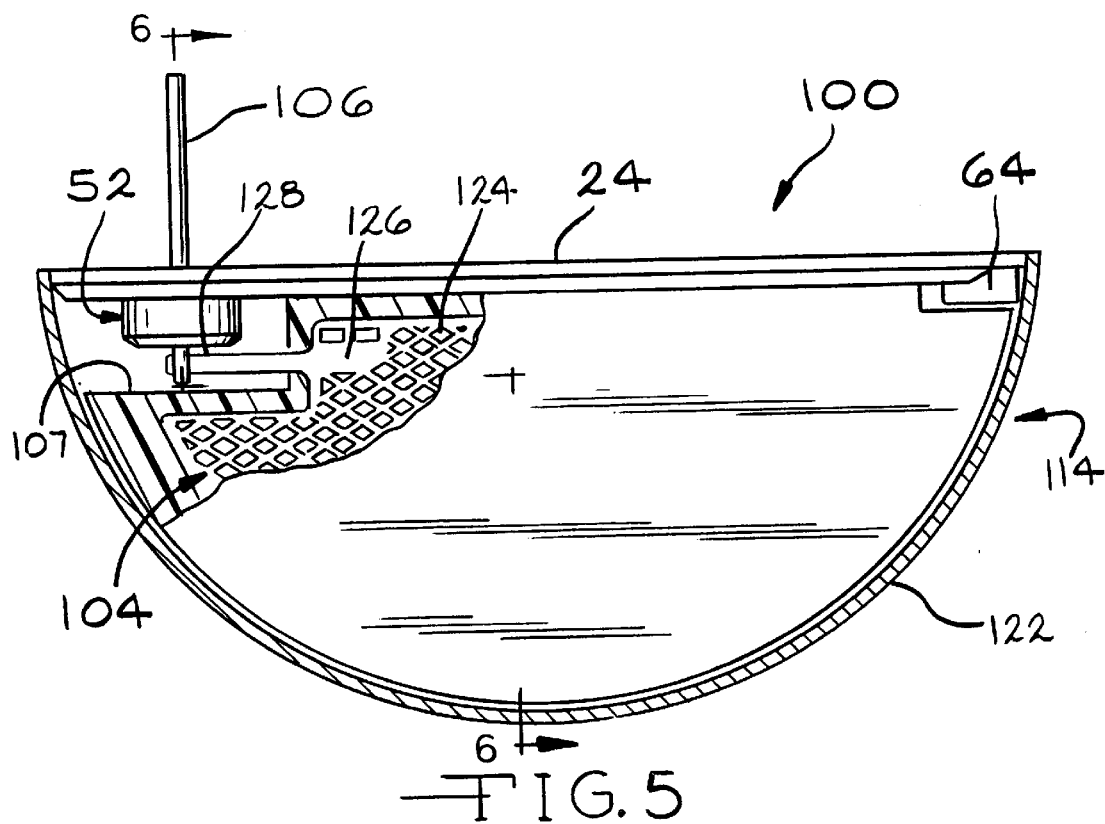

FIG. 5 is a side, cross-sectional view of an electrochemical cell 100 having a cathode electrode 102 with a radius edge 112 according to the present invention.

Figure 6:
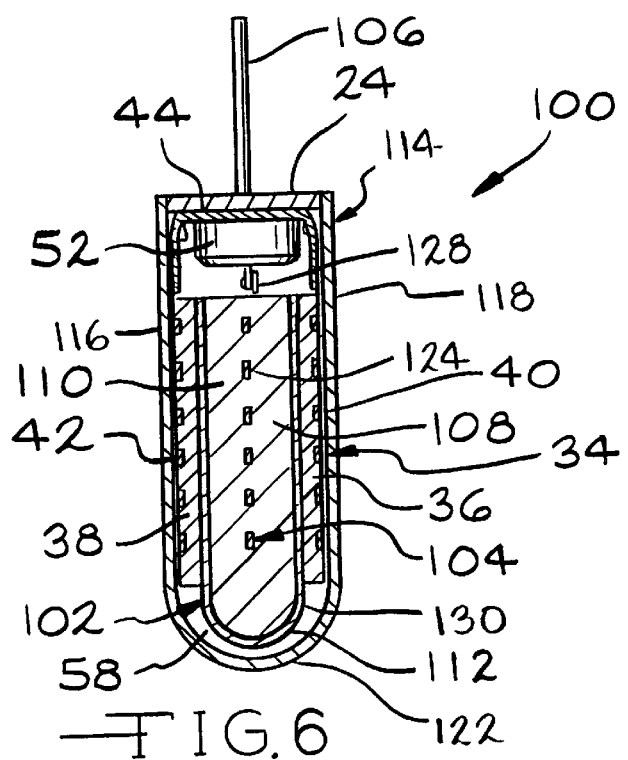

FIG. 6 is a cross-sectional view taken along line 6—6 of FIG. 5.

DETAILED DESCRIPTION OF THE ILLUSTRATED EMBODIMENT

Figure 1:
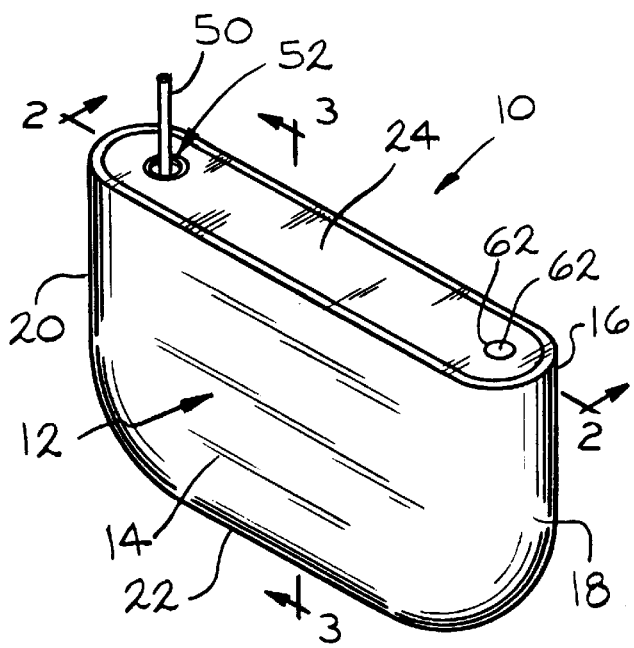
FIG. 1 is a perspective view of a prismatic electrochemical cell 10 according to the prior art.
Figure 3:
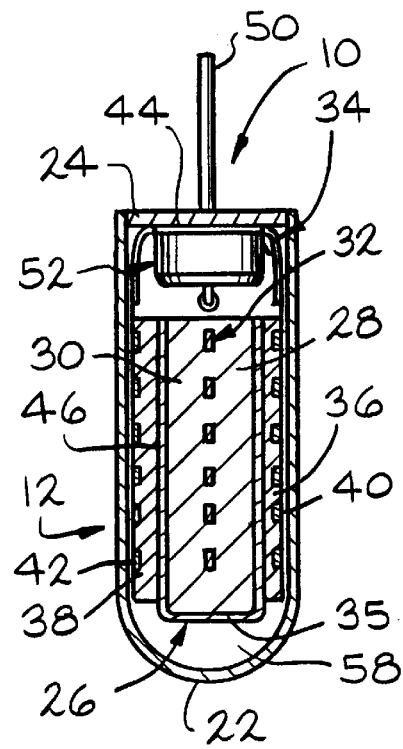
FIG. 3 is a cross-sectional view taken along line 3—3 of FIG. 1.
Figure 2:
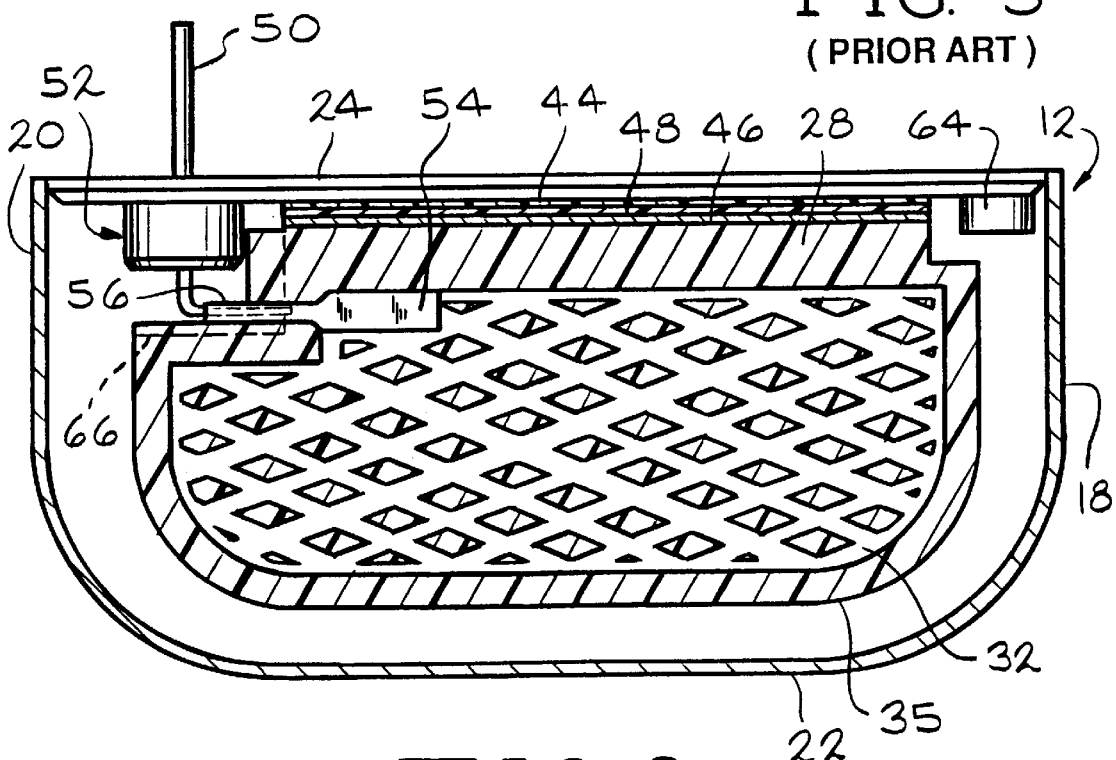
FIG. 2 is a cross-sectional view taken along line 2—2 of FIG. 1.
Figure 4:
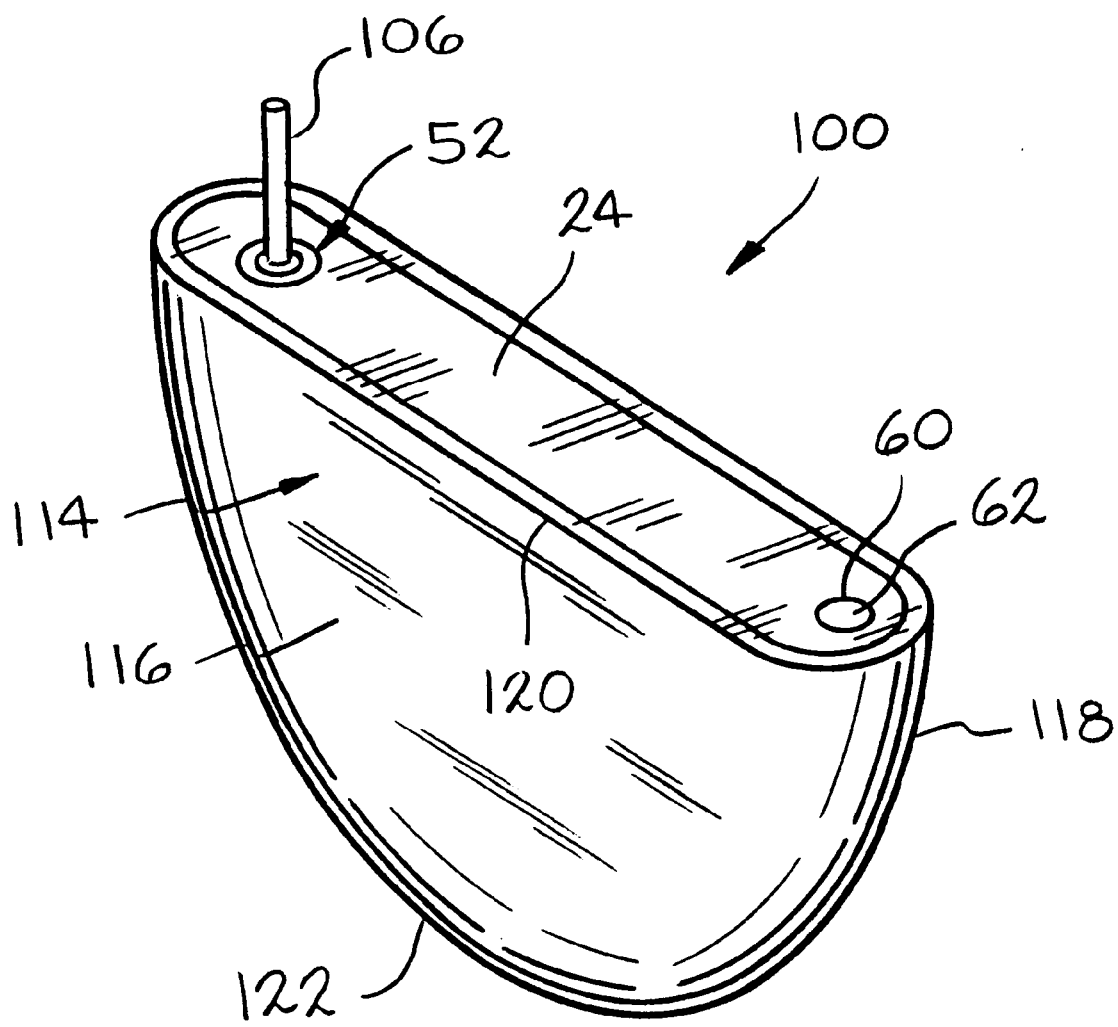
FIG. 4 is a perspective view of a prismatic electrochemical cell 100 according to the present invention.

Referring now to FIGS. 4 to 6, there is shown a prismatic electrochemical cell 100 according to the present invention. Except where discussed below, electrochemical cell 100 is similar to the prismatic electrochemical cell 10 of U.S. Pat. No. 5,250,373 to Muffoletto et al. previously described in the Prior Art section. In that respect, those parts or members which are the same in the prior art cell (FIGS. 1 to 3) and the electrochemical cell 100 of the present invention are provided with the same numerical designations.

Cell 100 includes a cathode electrode 102 having a current collector 104 connected to a terminal lead 106 in the novel, robust construction described in detail in the previously referenced U.S. Pat. No. 5,750,286 to Paulet et al. As previously discussed, the current collector 104/lead 106 combination for the cathode electrode 102 replaces the lead 50 welded in the open end of the tube of the coupling element 56 (FIG. 2) according to the prior art. However, the novel current collector 104/lead 106 combination requires removal of a portion 66 (shown in dashed lines in FIG. 2) of the cathode plates 28, 30 immediately proximate thereto to provide a step 107 (FIG. 5). Thus, the cathode plates according to the present invention are designated 108 and 110 and differ from the prior art cathode plates 28, 30, in part, by the step 107 provided adjacent to the terminal lead connection and by the novel, full radius edge 112, as will be described in detail presently.

The novel cathode electrode 102 is readily incorporated into alkali metal/solid cathode or alkali metal/oxyhalide electrochemical cells of both solid cathode and liquid electrolyte types without having to be changed or otherwise modified itself. The cell 100 shown in FIGS. 4 to 6 is exemplary of the solid cathode type housed inside of a conductive casing 114 having a shape somewhat different than that of the prior art cell 10. Casing 114 has spaced-apart generally planar front and back side walls 116 and 118, each having a semicircular shape with an upper planar edge 120. The side walls 116, 118 are joined by a semicircular intermediate end wall 122 that curves to meet them along their entire radial perimeter. Casing 100 is made of a conductive material preferably selected from the group consisting of nickel, aluminum, stainless steel, mild steel, tantalum and titanium. External cell electrical connection is provided by the terminal lead 106 and by a contact region comprising lid 24 or the entire conductive casing 114, which are insulated from the terminal lead 106.

The cathode electrode 102 has a body of solid cathode material in the form of an active mixture pressed or calendared against the cathode current collector 104. The cathode electrode 102 is provided with the full radius edge 112 which extends from adjacent to the step 107 and follows the radius and curvature of the intermediate wall 122 to a position proximate the insulator structure 64 for the cell closure 62.

This construction provides as great a quantity of cathode active material in electrochemical association with the anode as the internal volume of the casing 114 will accommodate. In a broader sense, however, the novel edge 112 is part of the intermediate electrode, whether it is the cathode or the anode, positioned inside the casing between the opposed plates of the counter electrode disposed in electrical contact with the casing serving as the terminal for the counter electrode. Such a construction is not known in the prior art.

The cathode current collector 104 comprises an apertured grid 124, an internal connection tab 126 in the form of a land that is co-planar with and surrounded on three sides by the grid 124, and an integral external connection tab 128. External connection tab 128 is an outwardly extending continuation of internal tab 126. The terminal lead 106 is shown connected to the external tab 128 in FIG. 5, however, it can be directly connected to the cathode current collector 104 at any contact point along the full extent of the internal tab 126 and the external tab 128. This construction eliminates the need for the provision of the prior art coupling element 56 (FIG. 2 and 3), and is more thoroughly described in the previously referenced U.S. Pat. No. 5,750,286 to Paulot et al.

Cell 100 further includes an anode electrode, for example an alkali metal anode electrode, generally designated 34, comprising a unitary, conductive member which serves as the anode current collector and is fabricated from a thin sheet of metal, preferably nickel, having the pair of wing-like sections 40 and 42 joined by the intermediate web section 44. The preferred alkali metal for the anode is lithium. Lithium anode elements 36 and 38 are in pressure bonded contact with and carried by corresponding ones of the electrode wing sections 40 and 42, respectively. The wing-like sections 40 and 42 are of a mesh formation to facilitate adherence to the lithium anode elements 36, 38. The lithium anode elements 36 and 38 are of a similar shape or configuration as the corresponding electrode wing sections 40 and 42, but of a slightly larger size or surface area so as to define a marginal or peripheral extension or border surrounding the perimeter of each wing section. Thus, the length and width of each of the lithium anode elements 36 and 38 is slightly greater than the length and width of the corresponding electrode wing sections 40 and 42 with the anode elements terminating a short distance from the electrode web section 44.

To construct an anode-cathode subassembly according to the present invention, the cathode plates 108 and 110 of solid cathode active material are first press contacted to the cathode current collector 104. The cathode active material is preferably comprised of a carbonaceous material, a metal, a metal oxide, a mixed metal oxide or a metal sulfide, and the cathode current collector 104 is fabricated from a thin sheet of metal selected from the group consisting of cobalt-nickel alloys, chromium ferritic, nickel alloys, aluminum, stainless steel, mild steel and titanium, with titanium being preferred.

The anode wing sections 40, 42 with the associated anode lithium elements 36, 38 are then folded relative to web section 44 and toward each other and in a manner to place the lithium anode elements 36, 38 in operative contact with the oppositely directed major surfaces of the cathode plates 108 and 110 joined together on either side of the current collector 104 to provide the novel, full radius edge 112 of the cathode electrode 102. The shielding and insulating sheets 48 are positioned between the web 44 and the cathode electrode. In particular, lithium anode element 36 is in operative contact with the cathode plate 108 through a portion of the thin sheet of separator material 130. Similarly, lithium anode element 38 is in operative contact with cathode plate 110 through another portion of the separator 130 which surrounds and envelopes the cathode body to prevent direct physical contact with the anode. The terminal lead 106 is then connected to the cathode current collector 104 extending through the header assembly comprising the glass-to-metal seal 52 fitted in the lid 24. FIG. 5 shows the lead 106 connected to the external connection tab 128 of the current collector 104. However, as previously discussed, lead 106 can be connected to the current collector 104 at any point along the extent of the internal tab 126 and the external tab 128 such as by welding to provide a robust connection between the cathode current collector and the lead 106.

The anode-cathode subassembly is positioned inside the casing 12 and the lid 24 is then hermetically sealed to the casing such as by welding. Cell 100 is completed by the liquid electrolyte 58 provided in casing 114 and sealed therein by the provision of the closure means 62 welded in the opening 60 to hermetically close the cell 100. Lead 106 is the positive electrical terminal connected to the cathode body electrode 102. With anode electrode 34 in operative contact with the conductive casing 114 through the web section 44 of the anode current collector in electrical contact therewith, the cell 100 of the present invention is in a case-negative electrical configuration.

By way of example, in an illustrative cell, the anode is of an alkali metal contacted to a nickel current collector, and the active material of cathode electrode 102 is of a metal, a metal oxide, a mixed metal oxide, a metal sulfide, a carbonaceous material, or a fluorinated carbon material.

In the case of a carbonaceous active material, the carbonaceous material preferably is prepared from carbon and fluorine, and includes graphitic and nongraphitic forms of carbon, such as coke, charcoal or activated carbon. The fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely. The preferred cathode active mixture comprises $CF_x$ combined with a discharge promoter component such as acetylene black, carbon black and/or graphite. Metallic powders such as nickel, aluminum, titanium and stainless steel in powder form are also useful as conductive diluents when mixed with the cathode active mixture of the present invention. If required, a binder material can also be used. Preferred binders comprise fluoro-resins in powdered form such as powdered polytetrafluoroethylene (PTFE).

Exemplary mixed metal oxide materials include silver vanadium oxide (SVO) cathode material as described in U.S. Pat. Nos. 4,310,609 and 4,391,729 to Liang et al., or copper silver vanadium oxide (CSVO) as described in U.S. Pat. Nos. 5,472,810 and 5,516,340 to Takeuchi et al., all assigned to the assignee of the present invention, the disclosures of which are hereby incorporated by reference. The SVO and CSVO materials are also preferably mixed with a discharge promoter component and a binder material. Cathode current collector 104 is preferably of titanium and terminal lead 106 is of molybdenum, titanium or aluminum, separator 130 is of a polyolefinic material or of a fluoropolymeric material provided in either a woven or non-woven construction, or combinations thereof. In the case of the cathode comprised of a carbonaceous active material, the electrolyte 58 is 1.0 M to 1.4 M $LiBF_4$ in γ-butyrolactone while a cell having a metal-containing cathode active material is preferably activated with an electrolyte of a 1.0 M to 1.4 M solution of $LiAsF_6$ or $LiPF_6$ in a 50:50 mixture of, by volume, 1,2-dimethoxyethane and propylene carbonate.

Glass seal 32 is of CABAL 12 TA-23, FUSITE 425 or FUSITE 435 hermetic sealing glass, and closure means 28 is of stainless steel, titanium or nickel.

The electrochemical cell 100 of the present invention can also be constructed having a case-positive electrical configuration provided by placing the cathode parts in contact with the conductive cell casing 114. In particular and referring to the anode-cathode subassembly of FIGS. 5 and 6, a case-positive electrical configuration is provided by replacing lithium anode elements 36, 38 with cathode plates 108, 110 on the electrode wing sections 40, 42. Accordingly, cathode electrode 102 is replaced by the pair of lithium anode elements 36, 38, each contributing approximately one-half of the novel, full radius edge 112 sandwiched together and against the apertured grid 124 serving as an anode current collector which, in turn, is connected to the terminal lead 106 via electrical contact to at least one of the internal connection tab 126 and the external connection tab 128, and with the lead 106 insulated from lid 24 by the glass-to-metal seal 52. With the cathode plates 108, 110 in contact with electrode wing sections 40, 42 and with the electrode web section 44 in contact with the cell casing 12, a cell is provided in a case-positive electrical configuration. In all other respects, the anode electrode in the case-positive configuration is similar to that previously described with respect to cell 100 having the case-negative configuration.

It is therefore apparent that the present invention accomplishes its intended objects. While embodiments of the present invention have been described in detail, that is for the purpose of illustration, not limitation.

What is claimed is:

1. An electrochemical cell, which comprises:
   a) a casing having spaced apart side walls joined by an intermediate wall having a generally radius curved shape;
   b) a first electrode provided inside the casing adjacent to the opposed side walls;
   c) a second electrode intermediate the first electrode wherein the second electrode has a radius curved edge extending to and meeting with opposed surfaces of the second electrode in a face-to-face relationship with immediately proximate portions of the first electrode provided adjacent to the casing side walls; and
   d) an electrolyte activating and operatively associating the first electrode with the second electrode.

2. The electrochemical cell of claim 1 wherein the casing is conductive and serves as a terminal for one of the electrodes.

3. The electrochemical cell of claim 1 wherein the casing is comprised of a metal selected from the group consisting of titanium, aluminum, nickel, stainless steel, mild steel and tantalum, and mixtures thereof.

4. The electrochemical cell of claim 1 wherein the first electrode is an anode connected to the casing in a case-negative configuration.

5. The electrochemical cell of claim 1 wherein the first electrode is the anode comprised of an alkali metal and wherein the second electrode is a solid cathode comprising a cathode active material selected from the group consisting of a metal, a metal oxide, a mixed metal oxide, a metal sulfide and a carbonaceous material, and mixtures thereof.

6. The electrochemical cell of claim 1 wherein the second electrode further includes a current collector having a support surface supporting the second electrode, and internal connection tab generally disposed within a perimeter of the support surface, and an external connection tab disposed outside the perimeter of the support surface, wherein the internal tab and the external tab provide for selective connection of the current collector means to a lead.

7. The electrochemical cell of claim 1 wherein the internal tab is continuous with the external tab.

8. The electrochemical cell of claim 1 wherein the support surface is apertured.

9. The electrochemical cell of claim 1 wherein the support surface, the internal tab and the external tab are comprised of a conductive material selected from the group consisting of a cobalt-nickel alloy, a chromium ferritic alloy, nickel, aluminum, stainless steel, mild steel and titanium, and mixtures thereof.

10. The electrochemical cell of claim 1 wherein the internal tab is co-planar with the support surface.

11. An electrode for an electrochemical cell, the electrode comprising:

(a) a current collector, which comprises:
   i) a support surface for supporting an electrode active material;
   ii) an internal connection tab generally disposed within a perimeter of the support surface; and
   iii) an external connection tab disposed outside the perimeter if the support surface;
b) an electrode body of an electrode active material contacted to the opposed sides of the support surface to enclose the perimeter of the support surface, wherein the electrode body has opposed major surfaces extending to an intermediate edge having full radius curve joining with the major surfaces; and
c) a terminal lead selectively connected to at least one of the internal connection tab or the external connection tab, or both.

12. The electrode of claim 11 wherein the electrode active material is characterized as having been pressed or calendared to the support surface.

13. The electrode of claim 11 wherein the electrode is a solid cathode comprising a cathode active material selected from the group consisting of a metal, a metal oxide, a mixed metal oxide, a metal sulfide and a carbonaceous material, and mixtures thereof.

14. The electrode of claim 11 wherein the internal tab is continuous with the external tab.

15. The electrode of claim 11 wherein the support surface is apertured.

16. The electrode of claim 11 wherein the support surface, the internal tab and the external tab are comprised of a conductive material selected from the group consisting of a cobalt-nickel allo9y, a chromium ferritic alloy, nickel, aluminum, stainless steel, mild steel and titanium, and mixtures thereof.

17. In an electrochemical cell compromising an anode and a cathode, the improvement comprising:

the cathode electrode comprising fluorinated carbon active material in electrical contact with a current collector comprising a conductive support surface having an internal connection tab generally disposed within the perimeter of the support surface and an external connection tab disposed outside the perimeter of the support surface with the active material contacted to opposed sides of the support surface to enclose the perimeter of the support surface, wherein the electrode body has opposed major surfaces extending to an intermediate edge having a full radius curve joining with the major surfaces; and a terminal lead selectively connected to at least one of the internal connection tab or external connection tab, or both.

18. The electrochemical cell of claim 17 wherein the support surface, the internal tab and the external tab are comprised of a conductive material selected from the group consisting of a cobalt-nickel alloy, a chromium ferritic alloy, nickel, aluminum, stainless steel, mild steel and titanium, and mixtures thereof.

19. The electrochemical cell of claim 17 wherein the internal tab is co-planar with the support surface.

20. A method of providing an electrochemical cell, comprising the steps of:

a) providing a casing having spaced apart side walls joined by an intermediate wall having a generally radius curved shape;
b) providing a first electrode inside the casing adjacent to the opposed side walls;
c) positioning a second electrode inside the casing intermediate the first electrode including providing the second electrode with a radius curved edge extending to and meeting with opposed surfaces of the second electrode in a face-to-face relationship with immediately proximate portions of the first electrode provided adjacent to the casing side walls; and
d) activating and operatively associating the first electrode with the second electrode by filling an electrolyte into the casing.

21. The method of claim 20 including providing the casing of a conductive material serving as a terminal for one of the electrodes.

22. The method of claim 20 including providing the casing comprised of a metal selected from the group consisting of titanium, aluminum, nickel, stainless steel, mild steel and tantalum, and mixtures thereof.

23. The method of claim 20 including providing the first electrode as an anode connected to the casing in a case-negative configuration.

24. The method of claim 20 including providing the first electrode as the anode comprised of an alkali metal and further including providing the second electrode as a solid cathode comprising a cathode active material selected from the group consisting of a metal, a metal oxide, a mixed metal oxide, a metal sulfide and a carbonaceous material, and mixtures thereof.

25. The method of claim 20 including providing the second electrode comprising a current collector having a support surface supporting the second electrode, an internal connection tab generally disposed within a perimeter of the support surface, and an external connection tab disposed outside the perimeter of the support surface, wherein the internal tab and the external tab provide for selective connection of the current collector means to a lead.

26. The method of claim 20 including providing the internal tab as continuous with the external tab.

27. The method of claim 20 including providing the support surface as apertured.

28. The method of claim 20 including providing the support surface, the internal tab and the external tab comprised of a conductive material selected from the group consisting of a cobalt-nickel alloy, a chromium ferritic alloy, nickel, aluminum, stainless steel, mild steel and titanium, and mixtures thereof.

29. The method of claim 20 including providing the internal tab co-planar with the support surface.

30. A method of providing an electrode for an electrochemical cell, comprising the steps of:

a) providing a current collector comprising:
  i) a support surface;
  ii) an internal connection tab generally disposed within a perimeter of the support surface; and
  iii) an external connection tab disposed outside the perimeter of the support surface;
b) providing an electrode body by contracting an electrode active material to opposed sides of the support surface to enclose the perimeter of the support surface, wherein the electrode body has opposed major surfaces extending to an intermediate edge having a full radius curve joining with the major surfaces; and
c) selectively connecting a terminal lead to at least one of the internal connection tab or the external connection tab, or both.

31. The method of claim 30 including pressing the electrode active material to the support surface.

32. The method of claim 30 including providing the electrode as a solid cathode of cathode active material and selecting the cathode active material from the group consisting of metal, a metal oxide, a mixed metal oxide, a metal sulfide and a carbonaceous material, and mixtures thereof.

33. The method of claim 30 including providing the internal tab continuous with the external tab.

34. The method of claim 30 including providing the support surface as apertured.

35. The method of claim 30 including providing the support surface, the internal tab and the external tab comprising a conductive material selected from the group consisting of nickel, a cobalt-nickel alloy, a chromium ferritic alloy, aluminum, stainless steel, mild steel and titanium, and mixtures thereof.

* * * * *